US011576381B2

(12) United States Patent
Shelton et al.

(10) Patent No.: US 11,576,381 B2
(45) Date of Patent: Feb. 14, 2023

(54) COMPOSITION AND A METHOD OF USING THE COMPOSITION TO INCREASE WHEAT YIELD

(71) Applicant: ALBAUGH, LLC, Ankeny, IA (US)

(72) Inventors: Chad Shelton, Rosalia, WA (US); Morris Gaskins, Lake Park, GA (US); Jaime Yanes, Colliervilla, TN (US)

(73) Assignee: Albaugh, LLC, Ankeny, IA (US)

( * ) Notice: Subject to any disclaimer, the term of this patent is extended or adjusted under 35 U.S.C. 154(b) by 0 days.

(21) Appl. No.: 16/284,270

(22) Filed: Feb. 25, 2019

(65) Prior Publication Data

US 2020/0267982 A1    Aug. 27, 2020

(51) Int. Cl.
| | |
|---|---|
| *A01N 43/60* | (2006.01) |
| *A01N 37/34* | (2006.01) |
| *A01N 39/04* | (2006.01) |
| *A01N 43/40* | (2006.01) |
| *A01N 43/56* | (2006.01) |

(52) U.S. Cl.
CPC ............. *A01N 43/60* (2013.01); *A01N 37/34* (2013.01); *A01N 39/04* (2013.01); *A01N 43/40* (2013.01); *A01N 43/56* (2013.01)

(58) Field of Classification Search
CPC ........ A01N 43/60; A01N 37/34; A01N 39/04; A01N 43/40; A01N 43/56; A01N 37/40
See application file for complete search history.

(56) References Cited

U.S. PATENT DOCUMENTS

| | | | |
|---|---|---|---|
| 6,017,850 | A | 1/2000 | Johnson |
| 6,054,410 | A | 4/2000 | Landes |
| 6,147,030 | A | 11/2000 | Mito |
| 6,159,899 | A | 12/2000 | Hudetz |
| 6,239,072 | B1 | 5/2001 | Flint |
| 6,362,133 | B1 | 3/2002 | Landes |
| 6,369,001 | B1 | 4/2002 | Jimoh |
| 6,479,432 | B1 | 11/2002 | Sixl |
| 6,486,096 | B1 | 11/2002 | Hacker |
| 6,569,809 | B1 | 5/2003 | Sato |
| 6,677,276 | B1 | 1/2004 | Hacker |
| 6,774,085 | B1 | 8/2004 | Hacker |
| 7,105,470 | B1 | 9/2006 | Hacker |
| 8,110,530 | B2 | 2/2012 | Yamaji |
| 8,338,332 | B1 | 12/2012 | Hacker |
| 8,530,386 | B2 | 9/2013 | Hacker |
| 8,785,350 | B2 | 7/2014 | Hacker |
| 8,785,351 | B2 | 7/2014 | Mann et al. |
| 2011/0287933 | A1 | 11/2011 | Hacker |
| 2014/0045686 | A1 | 2/2014 | Mankin |
| 2014/0250543 | A1 | 9/2014 | Ostlie |
| 2015/0189879 | A1 | 7/2015 | Mann et al. |

OTHER PUBLICATIONS

Gowan, Material safety data sheet, TARGA, Emulsifiable concentrate, pp. 1-4. (Year: 2007).*
Gowan, TARGA Herbicide, Emulsifiable concentrate, pp. 1-15. (Year: 2007).*
Blackshaw et al, Broadleaf herbicide effects on clethodim and quizalofop-P efficacy on volunteer wheat (*Triticum aestivum*), Weed Technology, vol. 20: 221-226 (Year: 2006).*
K-State Agronomy eUpdates, Extension Agronomy; CoAXium wheat and Aggressor herbicide for grass weed control. pp. 1-3. (Year: 2018).*
Shehzad et al, Weed control and yield attributes against post-emergence herbicides application in wheat crop, Punjab, Pakistan. Global advanced research Journal of agricultural science, vol. 1(1) pp. 007-016. (Year: 2012).*
Baghestani et al, Study on the efficacy of weed control in wheat (*Triticum aestivum* L.) with tank mixtures of grass herbicides with broadleaved herbicides, Crop protection 27 (2008) 104-111, Elsevier (Year: 2008).*
National Association of Wheat Growers;Wheat Facts Dec. 31, 2018.
USDA ERS; Wheat Aug. 9, 2017.
MSU Extension; Weed Control in Winter Wheat: Things to Consider Apr. 26, 2018.
Extoxnet; Quizalofop-p-ethyl Sep. 30, 1993.
Ag Phd; Information for Agriculture—Grass Control in Wheat Apr. 16, 2014.
Texas A&M Agrilife Extension; Weed Control Recommendations in Wheat Feb. 28, 2016.
National Association of Wheat Growers; Wheat Production Map Dec. 31, 2018.
DuPont Quizalofop P-Ethyl Technical Herbicide, EPA—PRIA Label Amendment, Apr. 12, 2018, p. 1-30, United States Environmental Protection Agency, Washington D.C. Apr. 12, 2018.

(Continued)

*Primary Examiner* — Mina Haghighatian
(74) *Attorney, Agent, or Firm* — Jordan Meggison-Decker; BrownWinick Law Firm

(57) ABSTRACT

The present invention comprises a novel combination and composition for controlling weeds in wheat. The combination comprises a post-emergence phenoxy herbicide such as Quizalofop-p-ethyl (QPE). The novel composition further includes a broadleaf herbicide. When applied to wheat comprising QPE tolerance, surprisingly, the novel composition appears to provide synergy that results in increased wheat yield over and above the yield expected from wheat intolerant of QPE, untreated wheat, or wheat treated with either QPE or a broadleaf herbicide. Despite the fact that QPE is typically used to kill members of the grass family, the present invention successfully employs the novel combination to increase wheat yield.

5 Claims, 1 Drawing Sheet

(56) References Cited

OTHER PUBLICATIONS

David C. Blouin, Eric P. Webster, and Wei Zhang, Analysis of Synergistic and Antagonistic Effects of Herbicides Using Nonlinear Mixed-Model Methodology, Journal, Jan. 20, 2017, Abstract, vol. 18 Issue 2, Cambridge University Press, United States.

Josie Hugie, Stott Howard, Determination of Tank-Mixture Efficacy, Power-Point, Dec. 2, 2009, Syngenta Crop Protection, Des Moines, Iowa.

S.R. Colby, Calculating Synergistic and Antagonistic Responses of Herbicide Combinations, Journal, Jan. 1967, Abstract, vol. 15, No. 1, Cambridge University Press, United States.

* cited by examiner

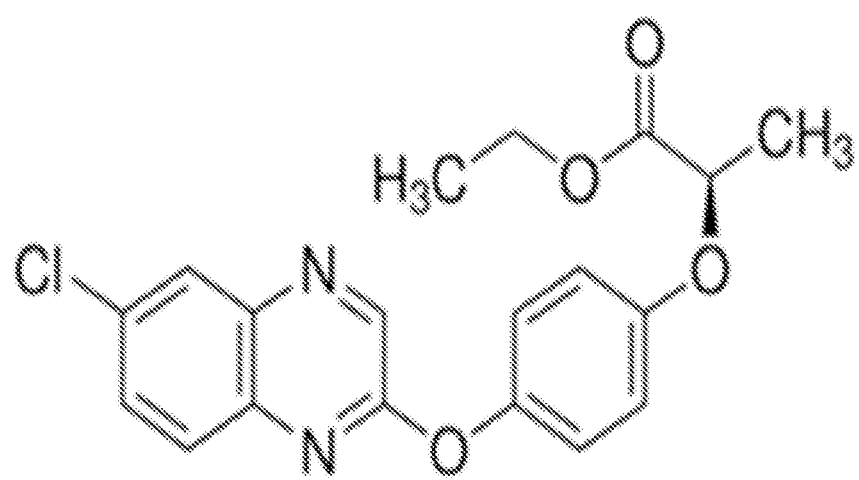

COMPOSITION AND A METHOD OF USING THE COMPOSITION TO INCREASE WHEAT YIELD

FIELD

The present invention provides novel compositions for controlling weeds comprising Quizalofop-p-ethyl (QPE) and a broadleaf herbicide applied to wheat.

BACKGROUND

Wheat ranks third among US field crops in planted acreage, production, and gross farm receipts behind corn and soybeans. In 2016/2017 U.S. farmers produced a total of 0.820 billion bushels of winter, other spring, and durum wheat on 50.2 million acres of cropland. Wheat grows best when temperatures are warm, from 70-75 F, but not too hot and needs between 12 and 15 inches of water to produce a good crop. For this reason, in some areas of the country wheat is grown in the winter to take advantage of the expected temperatures and rainfall in that particular climate, while in other geographic areas wheat may be grown over the spring/summer months.

Like many crops, in addition to the effects of weather conditions on wheat yield, pests and competitive plants can negatively affect yield. Pests may damage wheat plants and include aphids, stink bugs, armyworms, cutworms, cereal leaf beetles, thrips, hessian fly, wheat stem maggot, sawfly, white grubs, wireworms, slugs, snails, grasshoppers, crickets and mites in addition to a long list of fungal, bacterial, and viral diseases. And, as for many crops, any other plant growing in a field of wheat is competing for moisture, nutrients, and sunlight; therefore, crop yields can be preserved by removal or prevention of weed competition and by eradication or reduction of pests. Controlling for both grasses and broadleaf plants is, therefore, an important aspect of wheat cultivation. Weeds may be removed mechanically, chemically, and systemically by a variety of practices, products, and strategies.

In response to the damage done by pests and competing plants, a variety of pesticides and herbicides have been developed that are known to be useful in controlling weeds in various crops. Some of those are effective on broadleaf weeds, some on grasses. For example, there are a number of herbicides that kill grasses but do not cause any (or at least not the same degree of) damage to broadleaf plants, and vice versa.

Broadleaf weeds in wheat are many. Examples may include any one or more of the following, depending on where the wheat is grown: Canada thistle (*Cirsium arvense*), Field Bindweed (*Convolvulus arvensis*), Creeping Jenny (*Lysimachia nummularia*), Field Pennycress (*Thlaspi arvense*), Henbit (*Lamium amplexicaule*), Kochia (*Bassia* spp.), Lambsquarters (*Chenopodium album*), Pigweed (*Amaranthus* spp.), Water Hemp (*Amaranthus tuberculatus*), Prickly lettuce (*Lactuca serriola*), Russian thistle (*Salsola tragus*), and Wild buckwheat (*Polygonum convolvulus*).

Broadleaf weeds in wheat may be controlled by application of one or a combination of:

4-CPA; 4-CPB; 4-CPP; 2,4-D; 2,4-D choline salt, 2,4-D esters and amines, 2,4-DB; 3,4-DA; 3,4-DB; 2,4-DEB; 2,4-DEP; 3,4-DP; 2,3,6-TBA; 2,4,5-T; 2,4,5-TB; acifluorfen, aclonifen, acrolein, alachlor, allidochlor, alloxydim, allyl alcohol, alorac, ametridione, ametryn, amibuzin, amicarbazone, amidosulfuron, aminocyclopyrachlor, aminopyralid, amiprofos-methyl, amitrole, ammonium sulfamate, anisuron, asulam, atraton, atrazine, azafenidin, azimsulfuron, aziprotryne, barban, BCPC, beflubutamid, benazolin, bencarbazone, benfluralin, bensulfuron-methyl, bensulide, benthiocarb, bentazon-sodium, benzadox, benzfendizone, benzipram, benzobicyclon, benzofenap, benzofluor, benzoylprop, benzthiazuron, bialaphos, bicyclopyrone, bifenox, bilanafos, bispyribac-sodium, borax, bromacil, bromobonil, bromobutide, bromofenoxim, bromoxynil, brompyrazon, butafenacil, butamifos, butenachlor, buthidazole, buthiuron, butralin, butroxydim, buturon, butylate, cacodylic acid, calcium chlorate, calcium cyanamide, cambendichlor, carbasulam, carbetamide, carboxazole chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorpropham, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclopyrimorate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, dichlorprop, dichlorprop-P, diclofop-methyl, diclosulam, diethamquat, diethatyl, difenopenten, difenoxuron, difenzoquat, diflufenican, diflufenzopyr, dimefuron, dimepiperate, dime thachlor, dimethametryn, dimexano, dimidazon, dinitramine, dinofenate, dinoprop, dinosam, dinoseb, dinoterb, diphenamid, dipropetryn, diquat, disul, dithiopyr, diuron, DMPA, DNOC, DSMA, EBEP, eglinazine, endothal, epronaz, EPTC, erbon, ethalfluralin, ethbenzamide, ethametsulfuron, ethidimuron, ethiolate, ethobenzamid, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenteracol, fenthiaprop, fenuron, ferrous sulfate, flamprop, flamprop-M, flazasulfuron, florasulam, fluazifop, fluazifop-P-butyl, fluazolate, flucarbazone, flucetosulfuron, fluchloralin, flufenican, flufenpyr-ethyl, flumetsulam, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, fluorochloridone, fluoroxypyr, fluoroxypyr-meptyl, flurtamone, fluthiacet, fomesafen, foramsulfuron, fosamine, fumiclorac, furyloxyfen, glufosinate, glufosinate-ammonium, glufosinate-P-ammonium, glyphosate salts and esters, halauxifen, halauxifen-methyl, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, imazethapyr, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxaben, isoxachlortole, isoxaflutole, isoxapyrifop, karbutilate, ketospiradox, lactofen, lenacil, linuron, MAA, MAMA, MCPA esters and amines, MCPA-thioethyl, MCPB, mecoprop, mecoprop-P, medinoterb, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, me thiuron, methometon, methoprotryne, methyl bromide, methyl isothiocyanate, methyldymron, metobenzuron, metobromuron, metosulam, metoxuron, metribuzin, metsulfuron, metsulfuron-methyl, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, ortho-dichlorobenzene, orthosulfamuron, oryzalin, oxadiargyl, oxadiazon, oxapyrazon, oxasulfuron, oxaziclomefone, oxyfluorfen, paraflufen-ethyl, parafluoron, paraquat, pebulate, pelargonic acid, pendimethalin, penoxsulam, pentachlorophenol, pentanochlor, pentoxazone, perfluidone, phenisopham, phenmedipham, phenmedipham-ethyl, phenobenzuron, phenylmercury acetate, picloram, picolinafen, pinoxaden, piperophos, potassium arsenite, potassium azide, potassium cyanate, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propham, propisochlor, propoxycarbazone, propyrisulfuron, propyzamide, prosulfalin, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, SYN-523, TCA, tebutam, tebuthiuron, tefuryltrione, tembotrione, tepraloxydim, terbacil, terbucarb, terbuchlor, terbumeton, terbuthylazine, terbutryn, tetrafluoron, thiazafluoron, thiazopyr, thidiazimin, thidiazuron, thiencarbazone-methyl, thifensulfuron, thifensulfurn-methyl, tiocarbazil, tioclorim, topramezone, tralkoxydim, triafamone, tri-allate, triasulfuron, triaziflam, tribenuron, tribenuron-methyl, tricamba, triclopyr choline salt, triclopyr esters and salts, tridiphane, trietazine, trifloxysulfuron, trifluralin, triflusulfuron, trifop, trifopsime, trihydroxytriazine, trimeturon, tripropindan, tritac tritosulfuron, vernolate, xylachlor and salts, esters, optically active isomers and mixtures thereof.

This listing is intended to be one of example and not limitation as many more broadleaf herbicides are available. These herbicides kill or damage plants in the broadleaf category. Recommended application may be pre-emergence or post-emergence, depending on the product and the weed.

Like broadleaf plant weeds, there are a number of growth-effecting grasses that may be found in wheat fields as well. These include cheat, downy brome, Italian ryegrass and others. However, control of grasses in wheat fields is trickier than control of broadleaf plants. Wheat is also a grass and, therefore, many products used in other crops to control grasses would be detrimental to yield and plant health if used in a field of wheat. Further, wheat from different families often benefit differently from different herbicides. Clearly, then, certain products that are used to kill weeds in the grass family cannot be used on cropland intended to grow or fields in which are growing grass-related crops, such as wheat unless the wheat is bred to be resistant to the product. Similarly, products used to control broadleaf family weeds cannot be used on fields intended to grow or in which are growing broadleaf crops such as soybeans unless a resistant soybean is planted.

Still, products for control of weeds in wheat are available. Some of the available products need to be applied in wheat fields pre-emergence and include Group 2 (ALS) herbicides. These are effective to control foxtails and wild oats, and suppression of cheat; Some ALS herbicides will also kill some broadleaf weeds. Post emergence weed control requires spraying early, and it is recommended that the producer rotate sites of action (in other words use products from different chemical families such as ACCase Inhibitors and ALS herbicides). Further, for major grass problems, it is recommended that broadleaf and grass herbicides are applied separately in order to gain the most effect from each. Yet, the products that cause little or no damage to the crop plant are limited. So, developers have also looked to ways to change the crop plant itself in order to be able to address the pest and weed problems.

Managing and maintaining yield despite the presence of known competitors or pests might be accomplished by altering the crop so that the products available can be used without damaging the crop. The concept of creating a crop that is immune to the effects of a certain herbicide so that the herbicide can be used in the field to control weeds is not new. An example is the development of glyphosate resistant soybeans. Glyphosate is a broad-spectrum systemic herbicide and crop desiccant. It is used to kill weeds, especially annual broadleaf weeds and grasses that compete with crops thereby preserving the yield expected where these weeds are not present. In order to gain the weed control benefits provided by glyphosoate, soybeans were genetically engineered to be glyphosate resistant.

QPE is an example of a selective, post-emergence phenoxy herbicide used to control grasses. It has been used for successful control of grasses in crops where the crop may include potatoes, soybeans, sugar beet, peanuts, vegetables, cotton and flax. The action of QPE is understood to be the result of its absorption from the plant's leaf surface after which it is moved through the plant. Specifically, it is a systemic herbicide, absorbed from the leaf surface, moving in both the xylem and phloem, and accumulating in the meristematic tissue. Eventually it accumulates in the then-active growing regions in the stems and roots. (See FIG. 1)

Its vapor pressure of 6.49×10-9 mm Hg at 20° C. indicates Quizalofop-p-ethyl will exist solely in the particulate phase in the ambient atmosphere. Removal of particulate-phase Quizalofop-p-ethyl from the atmosphere will occur through wet and dry deposition. If released to soil, Quizalofop-p-ethyl is expected to have low mobility based upon Koc values of 510 and 570. Volatilization from moist soil surfaces is not expected to be an important fate process. Quizalofop-p-ethyl is not expected to volatilize from dry soil surfaces based upon its vapor pressure. Further, this compound is degraded fairly slowly in the environment.

QPE-tolerant wheat has been bred. And at least one herbicide comprising QPE, known as Aggressor™, is being sold by Albaugh, LLC as a selective grass herbicide to control annual and perennial grasses in CoAXium™ Wheat varieties with the AXigen™ trait. The weeds controlled include Crowfoot Grass (*Dactyloctenium aegyptium*), Fall Panicum (*Panicum dichotomiflorum*), Field Sanbur (*Cenchrus longispinus*), Foxtail (*Alopecurus, Bromus madritensis, Hordeum jubatum, Setaria*), Goosegrass, Itchgrass (*Rottboellia cochinchinensis*), Sprangletop (*Leptochloa dubia*), volunteer barley, oats, rye, and wheat, Wild Oat (*Avena fatua*), Witchgrass (*Panicum capillare*), Feral Rye (*Secale cereale*), Barnyardgrass (*Echinochloa* spp.), Crabgrass (*Digitaria sanguinalis* and *Digitaria ischaemum*), Junglerice (*Echinochloa colona*), Texas Panicum (*Panicum* texanum), Red Rice (*Oryza punctate*), Woolly Cupgrass (*Eriochloa villosa*), Broadleaf Signalgrass (*Brachiaria platyphylla*), Jointed Goatgrass (*Aegilops cylindrical*), Italian Ryegrass (*Lolium multiflorum*), Downy Brome (*Bromus tectorum*), Windgrass (*Apera spica-venti*), Japanese Brome (*Bromus japonicas*), Wirestem Muhly (*Muhlenbergia frondosa*), Bermudagrass (*Cynodon dactylon*), Johnsongrass Rhizome (*Sorghum halepense*), and Quackgrass (*Elytrigia repens*).

The use of QPE on wheat does not typically negatively affect wheat yield, or at least does not result in an effect so negative it outweighs the benefit of using QPE. Still, the ever-present motivation to increase yields remains and continues to drive development of cultivation products and resulting yields.

SUMMARY

The control by QPE of grasses in QPE-tolerant wheat offers a way to minimize the deleterious effect on wheat yield that could be attributed to the presence of competitive grasses. However, the inventors discovered there were other effects attributable to use of QPE that were unexpected. Namely, the use of QPE in conjunction with a broadleaf herbicide for the purpose of controlling both grasses and broadleaf plants nicely controlled the presence of the grasses and broadleaf plants in QPE-tolerant wheat, as expected. However, the QPE-tolerant wheat did not produce yields at the rates expected and attributable to elimination of grasses and/or broadleaf plants; instead, when the QPE-tolerant wheat was treated by both QPE and a broadleaf herbicide, the yield of the treated wheat was higher than the yield increases recorded for QPE-tolerant wheat treated by only a broadleaf herbicide. Specifically, it was surprisingly determined that the inventive combinations of QPE and broadleaf herbicide produced a synergistic effect in yield over QPE-tolerant wheat treated with only one or the other.

BRIEF DESCRIPTION OF THE DRAWINGS

FIG. 1 is a diagram of a molecular structure of Quizalofop-p-ethyl (QPE)

DETAILED DESCRIPTION

The present invention employs a previously unknown synergistic relationship to attain markedly higher yields of wheat. Specifically, the invention demonstrates that the application of QPE and a broadleaf controller to QPE-tolerant wheat does not result in a simple additive increase in the yield of wheat. Further, the application of QPE to QPE tolerant wheat in combination with a broadleaf controller does not negatively affect the effectiveness of the broadleaf controller, nor is the effectiveness of QPE grass control decreased. Instead, wheat treated in the manner disclosed herein exhibits an increased yield over QPE-tolerant wheat treated with QPE alone, or treated with a broadleaf controller alone. The present invention demonstrates a previously unknown synergistic effect on yield offering producers a means to increase yield while managing weeds.

Yield of QPE-tolerant wheat in bushels per acre was measured under the following conditions: where no QPE was applied, where QPE was applied alone, where one or more broadleaf herbicides were applied, and where a combination of a QPE source and a broadleaf herbicide were applied together. For each test condition, the level of both grass control and broadleaf control was recorded. Finally, the application rate of each active substance was recorded. One QPE source is Aggressor™ which comprises Quizalofop-P-ethyl 10.3%. The results may be reviewed as presented below in Table 1.

TABLE 1

| Treatment A | Treatment B | Rate/Acre | Grass Control | Broadleaf Weed Control | Yield Bu/acre |
|---|---|---|---|---|---|
| Aggressor | | 8 | 94% | 0% | 71.2 |
| Aggressor | | 10 | 95% | 0% | 74.8 |
| Aggressor | | 12 | 96% | 0% | 75.4 |
| | 2,4-D Ester | .31 lb ai/acre | 0% | 85% | 56.4 |
| | 2,4-D Ester | .62 lb ai/acre | 0% | 95% | 57.3 |
| | MCPA Ester | .50 lb ai/acre | 0% | 90% | 58.3 |
| | MCPA Ester | 1.00 lb ai/acre | 0% | 95% | 60.2 |
| | 2,4-D Amine | .50 lb ai/acre | 0% | 75% | 55.7 |
| | 2,4-D Amine | 1.00 lb ai/acre | 0% | 90% | 56.8 |
| | MCPA Amine | .50 lb ai/acre | 0% | 78% | 52.4 |
| | MCPA Amine | 1.00 lb ai/acre | 0% | 93% | 56.9 |
| | Bromoxynil + MCPA | 16 fl oz/acre | 0% | 95% | 58.3 |
| | Bromoxynil + MCPA | 24 fl oz/acre | 0% | 98% | 60.1 |
| | Clopyralid + MCPA | 16 fl oz/acre | 0% | 90% | 59.3 |
| | Clopyralid + MCPA | 32 fl oz/acre | 0% | 96% | 60.2 |
| | Dicamba | 3 fl oz/acre | 0% | 90% | 56.7 |
| | Dicamba | 4 fl oz/acre | 0% | 93% | 57.9 |
| | Dicamba | 5 fl oz/acre | 0% | 96% | 58.4 |
| Everest | Flucarbazone | 2 oz/acre | 65% | 55% | 67.3 |
| | Starane Ultra | .105 lb ae/acre | 0% | 85% | 60.1 |
| | Starane Ultra | .210 lb ae/acre | 0% | 93% | 58.3 |
| Outrider | Sulfosulfuron | .66 oz/acre | 55% | 60% | |
| Osprey | Mesosulfuron | 4.75/acre | 35% | 50% | 60.4 |
| Olympus | Propoxycarbazone | .90 oz/acre | 45% | 65% | 63.2 |
| Peak | Prosulfuron | .60 oz/acre | 0% | 85% | 59.2 |
| Zidua | Pyroxsulam | 2 oz/acre | 70% | 30% | 60.3 |
| Harmony | Thifensulfuron | .30 oz/acre | 0% | 93% | 59.1 |
| Ally | Tribenuron | .30 oz/acre | 0% | 93% | 58.4 |
| Aggressor + | 2,4-D Ester | .31 lb ai/acre | 95% | 85% | 88.7 |
| Aggressor + | 2,4-D Ester | .62 lb ai/acre | 93% | 95% | 86.4 |
| Aggressor + | MCPA Ester | .50 lb ai/acre | 95% | 90% | 85.3 |
| Aggressor + | MCPA Ester | 1.00 lb ai/acre | 95% | 95% | 86.2 |

TABLE 1-continued

| Treatment A | Treatment B | Rate/Acre | Grass Control | Broadleaf Weed Control | Yield Bu/acre |
|---|---|---|---|---|---|
| Aggressor + | Bromoxynil + MCPA | 16 fl oz/acre | 98% | 95% | 88.3 |
| Aggressor + | Bromoxynil + MCPA | 24 fl oz/acre | 98% | 98% | 89.2 |
| Aggressor + | Clopyralid + MCPA | 16 fl oz/acre | 96% | 90% | 86.4 |
| Aggressor + | Clopyralid + MCPA | 32 fl oz/acre | 98% | 96% | 87.3 |
| Aggressor + | Dicamba | 3 fl oz/acre | 96% | 90% | 87.4 |
| Aggressor + | Dicamba | 4 fl oz/acre | 95% | 93% | 86.5 |
| Aggressor + | Dicamba | 5 fl oz/acre | 93% | 96% | 83.1 |
| Aggressor + | Flucarbazone | 2 oz/acre | 95% | 55% | 78.5 |
| Aggressor + | Starane Ultra | .105 lb ae/acre | 96% | 85% | 89.1 |
| Aggressor + | Starane Ultra | .210 lb ae/acre | 98% | 93% | 88.4 |
| Aggressor + | Mesosulfuron | 4.75 oz/acre | 95% | 65% | 79.5 |
| Aggressor + | Propoxycarbazone | .90 oz/acre | 95% | 83% | 81.2 |
| Aggressor + | Prosulfuron | .60 oz/acre | 98% | 85% | 82.6 |
| Aggressor + | Pyroxsulam | 2 oz/acre | 95% | 80% | 85.7 |
| Aggressor + | Thifensulfuron | .30 oz/acre | 96% | 93% | 86.4 |
| Aggressor + | Tribenuron | .10 oz/acre | 98% | 98% | 87.4 |
| Aggressor + | Sulfosulfuron | .66 oz/acre | 50% | 60% | 71.4 |
| Aggressor + | Pyroxasulfone | 1 & 2 oz/acre | 77% | 98% | 89.2 |
| Aggressor + | Pyrasulfotole + BroxM | 15 oz/acre | 95% | 98% | 89.6 |

Unexpectedly, a synergistic effect on yield was detected for certain combinations where the QPE source and a broadleaf herbicide were both applied. Broadleaf herbicides that are contemplated by the present invention include, but are not limited to the list provided in the "Background" section of this document. Specifically, 1) where the QPE source (0.88 lbs a.i./gallon) (where a.i. indicates "active ingredient") was applied at the rate of 8, 10, or 12 ounces per acre, without a broadleaf herbicide, yields were between 75.4 to 71.2 bu/acre and, generally, grass was controlled over 90%. And, 2) where the broadleaf herbicides were applied, either alone or in combination, at two different rates, but without QPE, broadleaf weeds were controlled and the yields were between 52.4 and 67.3. For the vast majority of trials where the QPE source was applied, grass was controlled.

When the broadleaf herbicides were applied, in combination with QPE, at two different rates, grass control was generally in the 90+% with a few exceptions. Further, the broadleaf herbicide/grass herbicide (QPE) combination resulted in yields exhibiting the synergistic effect of the combination. Namely, yield of wheat subjected to QPE treatment without broadleaf herbicide was 71.2 to 75.4 bu/acre. Yield of wheat subjected to broadleaf herbicide treatments without QPE ranged 52.4 to 67.3 bu/acre. But yields of the wheat treated with a combination of broadleaf herbicide and QPE ranged 71.4 to 89.6 and averaged 85.4 bu/acre. For most of the samples where the combination was applied, the combination also provided high levels of both grass and broadleaf control. It may have been expected that combining QPE and broadleaf herbicide might result in a yield better than one of the treatments, however, the combined treatment of broadleaf herbicide and QPE resulted in an increased reported yield that indicates more than a simple additive effect. Namely, 20 of the 23 trials where QPE and broadleaf herbicide was combined reported yields over 80 bu/acre with a high reported at 89.6 as compared to a control where only broadleaf treatment was applied and none of the 25 trials showed yields over 67.3 bushels/acre, and a control where only QPE was applied to three samples and their yields ranged 71.2 to 75.4 bushels/acre.

Finally, formulations and compositions comprising the present invention may be made as known by those of ordinary skill in the art and may comprise, but are not limited to, one or more of: wettable powder, dust, dispersion concentrate, emulsifiable concentrate, and water dispersible granules comprising or consisting of QPE, or QPE and a broadleaf herbicide.

We claim:

1. A method for controlling broadleaf weeds and grass in quizalofop-P-ethyl (QPE)-tolerant wheat, said method comprising applying broadleaf herbicide comprising one or more of bromoxynil+MCPA at a rate of 24 fl oz/acre, bromoxynil+MCPA at a rate of 16 fl oz/acre, clopyralid+MCPA at a rate of 32 fl oz/acre, clopyralid+MCPA at a rate of 16 fl oz/acre, pyroxasulfone at a rate of 1 oz/acre, pyroxasulfone at a rate of 2 oz/acre, 2,4-D ester at a rate of 0.62 lb a.i./acre, 2,4-D amine at a rate of 1.00 lb a.i./acre, 2,4-D amine at a rate of 0.5 lb a.i./acre, MCPA ester at a rate of 1.00 lb a.i./acre, MCPA ester at a rate of 0.5 lb a.i./acre, MCPA amine at a rate of 1.00 lb a.i./acre, and MCPA amine at a rate of 0.5 lb a.i./acre, and applying QPE at levels adequate to produce a synergistic effect on wheat yield resulting in yields above that expected from applying either a broadleaf herbicide without QPE or applying QPE without a broadleaf herbicide where a.i. indicates "active ingredient".

2. The method of claim 1 wherein QPE is applied at the rate of 8, 10, or 12 ounces per acre at 0.88 lbs a.i./gallon, where a.i. indicates "active ingredient".

3. The method of claim 1 wherein QPE is applied at one of 8, 10, and 12 ounces per acre.

4. A method of controlling broadleaf weeds and grass in wheat plants comprising QPE tolerance, said method comprising applying a composition comprising a broadleaf herbicide comprising one or more of bromoxynil+MCPA at a rate of 24 fl oz/acre, bromoxynil+MCPA at a rate of 16 fl oz/acre, clopyralid+MCPA at a rate of 32 fl oz/acre, clopyralid+MCPA at a rate of 16 fl oz/acre, pyroxasulfone at a rate of 1 oz/acre, pyroxasulfone at a rate of 2 oz/acre, 2,4-D ester at a rate of 0.62 lb a.i./acre, 2,4-D amine at a rate of 1.00 lb a.i./acre, 2,4-D amine at a rate of 0.5 lb a.i./acre, MCPA ester at a rate of 1.00 lb a.i./acre, MCPA ester at a rate of 0.5 lb a.i./acre, MCPA amine at a rate of 1.00 lb a.i./acre, and MCPA amine at a rate of 0.5 lb a.i./acre, and QPE, wherein the application rate of said QPE ranges between about 8 and about 12 ounces per acre QPE at 0.88 lbs a.i./gallon where a.i. indicates "active ingredient".

5. The method of claim 4 wherein said method produces a synergistic effect thereby increasing yield of said wheat plants above a yield of wheat plants to which a broadleaf herbicide is applied without QPE and above a yield of wheat plants to which QPE is applied without a broadleaf herbicide.

\* \* \* \* \*